Jan. 6, 1959

R. BOOLSKY-BOGOPOLSKY 2,867,152

OPTICAL SYSTEM COMPRISING TWO LENS ELEMENTS WITH ONE ELEMENT HAVING TWO SEPARATED CONCENTRIC SURFACES

Filed May 28, 1956

INVENTOR
Raphael Boolsky-Bogopolsky
BY
ATTORNEYS

United States Patent Office 2,867,152
Patented Jan. 6, 1959

2,867,152

OPTICAL SYSTEM COMPRISING TWO LENS ELEMENTS WITH ONE ELEMENT HAVING TWO SEPARATED CONCENTRIC SURFACES

Raphaël Boolsky-Bogopolsky, Geneva, Switzerland

Application May 28, 1956, Serial No. 587,866

7 Claims. (Cl. 88—57)

The present invention relates to optical systems. The invention provides a lens system comprising at least one component having on the one hand two concentric or substantially concentric refracting surfaces and on the other hand at least one dispersive refracting surface not concentric with the first-named surfaces. In this system the concentric surfaces may be considered to form a subcomponent having a nearly spherical stigmatic focal surface which is imaged on a nearly plane surface by the dispersive refracting surface.

Figure 1:
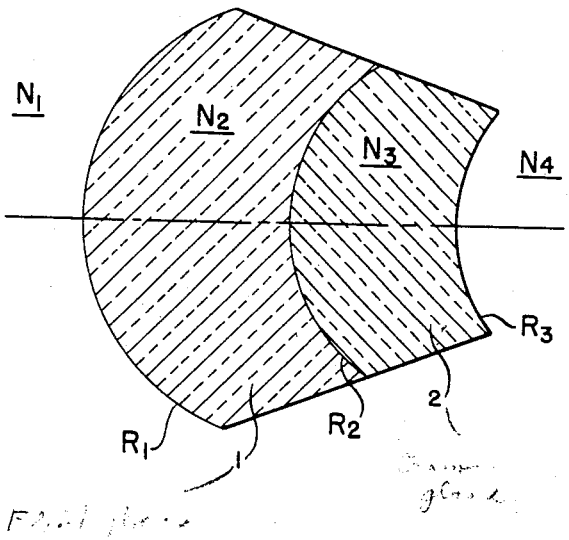
Figure 2:
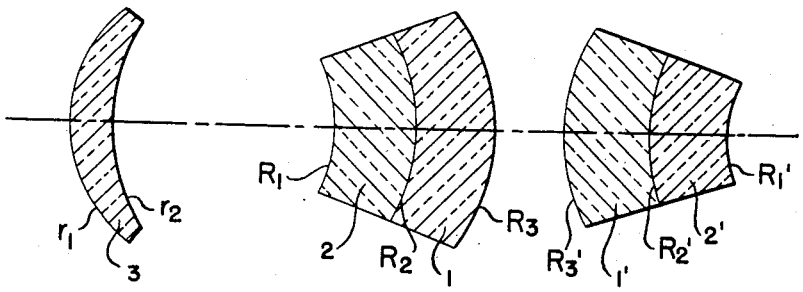

The invention will now be described in further detail by reference to the accompanying drawings in which:

Fig. 1 is an axial section through an objective component according to the invention; and Fig. 2 is an axial section through a lens system according to the invention including two objective components and a supplementary lens.

In Fig. 1 a front element 1 having concentric spherical surfaces $R_1$ and $R_2$ is cemented to a second element 2 of different refractive index. The surfaces $R_1$ and $R_2$ together make up the subcomponent having a nearly spherical stigmatic surface, and this subcomponent constitutes an immersed doublet. The last refracting surface $R_3$ is dispersive in effect and serves to flatten out the final image and to improve the stigmatic quality of the image focal points therein. The spaces to the left and right of the surfaces $R_1$ and $R_3$ in Fig. 1 are identified by index numbers $N_1$ and $N_4$ which have unity value, i. e. that of air, whereas the index $N_2$ of the element 1 is that of a heavy flint glass and the index $N_3$ of the element 2 is that of a light crown. Element 1 is accordingly made of heavy flint and element 2 of light crown glass.

In a preferred embodiment the relations among the radii are approximately as follows:

$$R_1/R_2 \approx 1.8$$

$$R_1/R_3 \approx 0.4$$

and the indices $N_2$ and $N_3$ are related approximately as 1.1 to 1.

In the embodiment of Fig. 2 the component of Fig. 1 is used twice with primed reference characters on the elements of the second component according to Fig. 1, and at least one meniscus component 3, of surface radii $r_1$ and $r_2$, is added to correct distortion.

The advantages of the subcomponent comprising the two concentric surfaces $R_1$ and $R_2$ lie in the fact that the existence of a stigmatic focus insures directly the achievement of two substantially stigmatic spherical focal surfaces. This means that the conditions necessary to produce a stigmatic focus are at the same time sufficient for the formation of stigmatic focal surfaces.

These conditions are simple and read as follows:

$$\sum_{k=1}^{n}(1 N_{k+1}^m - 1/N_k^m)/R_k^m = \left[\sum_{k=1}^{n}(1/N_{k+1} - 1/N_k)/R_k\right]^m$$

In the foregoing equation:

$m = 1, 3, 5, 7$, etc.

$n$ is the number of the concentric refracting surfaces.

$R_1, R_2 \ldots, R_k \ldots R_n$ are the radii of the successive refracting surfaces.

$N_1, N_2 \ldots N_k, N_{k+1} \ldots N_n, N_{n+1}$ are the indices of refraction of the various spaces, beginning with that preceding the first refracting surface $R_1$ and ending with the space following the last refracting surface $R_n$.

In practice the conditions for $m=1$ and $m=3$ prove sufficient and can be fulfilled with two concentric surfaces. These conditions need not be exactly satisfied since a complete correction can be achieved with other refracting surfaces which are not arranged concentrically.

For such a correcting surface one can use a simple spherical dispersively refracting surface to project the substantially spherical image surface produced by the above-mentioned subcomponent to form a final image on a slightly curved image surface of the fourth order.

In order to improve the stigmatic quality of the image produced by this projection, care must be taken to insure that the substantially spherical image surface produced by the subcomponent (i. e. by the refracting surfaces $R_1$ and $R_2$ in Fig. 1) will be located in the vicinity of the Young-Weierstrass object sphere for the dispersive projecting surface $(R_3)$.

The Young-Weierstrass sphere is, when considered as an object sphere, a portion of a spherical surface which is concentric with but of opposite sign, as regards its radius of curvature, to a spherical refracting surface in which it is to be imaged. If the refracting surface has a radius $R$ and separates two media of refractive indices $n_k$ and $n_{k+1}$ so that the relative index $n$ of the two media is $n_{k+1}/n_k$ with the light passing from the medium of index $n_k$ to the medium of index $n_{k+1}$, then the Young-Weierstrass object sphere has a radius $nR$. The object sphere thus defined has, in the refracting surface of radius $R$, a perfectly stigmatic image on a spherical surface termed the Young-Weierstrass image sphere. The Young-Weierstrass image sphere is also concentric with the refracting surface and has for its radius the same sign of curvature as has the Young-Weierstrass object sphere, the radius of curvature of the image sphere being $R/n$.

Based upon this principle there may be constructed a number of modifications in which a subcomponent of less completely stigmatic properties is combined with a dispersive surface in a position less strictly specified (i. e. by the relation of its Young-Weierstrass object sphere to the spherical image surface of the subcomponent) and having a curvature less closely specified. Such a combination can be arranged to produce again a nearly plane and stigmatic final image.

The lens of the invention, variously describable and usable as an objective or ocular, is in and for itself an anastigmat with a nearly plane focal surface. It is afflicted with a small amount of distortion which is easily corrected by the addition of additional components.

The objective component by itself forms a good objective lens but is advantageously used with a second component of the same type and with a supplementary thin lens as in the embodiment illustrated in Fig. 2.

I claim:

1. An optical system comprising two lens elements of which one element is limited by two separated and substantially concentric surfaces and the other element by a third and outer dispersive surface not concentric with said first-named surfaces, the concentric surfaces forming a subcomponent having a substantially spherical stigmatic focal surface which is imaged as an almost plane surface by the operation of the said outer dispersive surface of the second lens element.

2. An optical system comprising two cemented lens elements of unlike index of refraction, the first of said elements being bounded by two concentric surfaces and the other of said elements being bounded by one surface concentric with said first-named surfaces and by a second surface not concentric with said first-named surfaces, said concentric surfaces forming a subcomponent having a substantially spherical stigmatic focal surface which is imaged in an almost plane surface by the operation of said nonconcentric surface of the second lens element.

3. An optical system comprising two lens systems according to claim 1.

4. An optical system according to claim 3 including at least one meniscus component.

5. A lens comprising a first element of heavy flint glass bounded by two substantially concentric spherical surfaces and a second element of light crown glass cemented to said first element at the concave surface thereof, said second element being bounded on the side thereof remote from said first element by a concave spherical surface not concentric with said first-named surfaces, the ratio of the radius of the convex surface of said first element to the radius of the concave surface thereof being substantially 1.8 and the ratio of the radius of the convex surface of said first element to the radius of the concave surface of said second element being substantially 0.4.

6. A lens comprising a first element bounded by two substantially concentric spherical surfaces and a second element cemented to said first element at the concave surface thereof, said second element being bounded on the side thereof remote from said first element by a concave spherical surface not concentric with said first-named surfaces, the ratio of the radius of the convex surface of said first element to the radius of the concave surface thereof being substantially 1.8 and the ratio of the radius of the convex surface of said first element to the radius of the concave surface of said second element being substantially 0.4, the ratio of the index of refraction of said first element to the index of refraction of said second element being substantially 1.1.

7. A lens comprising a first element of heavy flint glass bounded by two substantially concentric spherical surfaces and a second element of light crown glass cemented to the first element at the concave surface thereof, said second element being bounded on the side thereof remote from said first element by a concave surface not concentric with said first-named surfaces, the concave surface of said second element being so disposed that the object sphere therefor of a radius (NR) concentric with and of opposite sign to the spherical refracting surface of radius R, where N is the relative index, lies substantially in the position of the image of a distant object produced by said first-named surfaces.

References Cited in the file of this patent

UNITED STATES PATENTS

| | | |
|---|---|---|
| 35,605 | Harrison et al. | June 17, 1862 |
| 554,737 | Schroeder | Feb. 18, 1896 |
| 562,614 | Kaempper | June 23, 1896 |
| 775,353 | Von Rohr | Nov. 22, 1904 |
| 2,063,178 | Merte | Dec. 8, 1936 |
| 2,388,119 | Burch | Oct. 30, 1945 |
| 2,656,761 | Blaisse | Oct. 27, 1953 |

FOREIGN PATENTS

| | | |
|---|---|---|
| 6,189 | Germany | July 19, 1879 |
| 510,835 | France | Sept. 14, 1920 |

OTHER REFERENCES

Southall-Book "Mirrors, Prisms, and Lenses," published by the Macmillan Co., New York, N. Y. 1923, pages 508–512 cited.